United States Patent
Kusama et al.

(10) Patent No.: US 10,158,107 B2
(45) Date of Patent: Dec. 18, 2018

(54) BATTERY COMPRISING INSULATIVE FILMS

(71) Applicant: TOYOTA JIDOSHA KABUSHIKI KAISHA, Toyota-shi, Aichi-ken (JP)

(72) Inventors: Kazuyuki Kusama, Nagoya (JP); Shigeru Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 327 days.

(21) Appl. No.: 15/088,448

(22) Filed: Apr. 1, 2016

(65) Prior Publication Data
US 2016/0293921 A1    Oct. 6, 2016

(30) Foreign Application Priority Data

Apr. 3, 2015   (JP) ................. 2015-077192

(51) Int. Cl.
| | |
|---|---|
| *H01M 2/16* | (2006.01) |
| *H01M 2/02* | (2006.01) |
| *H01M 2/06* | (2006.01) |
| *H01M 2/14* | (2006.01) |
| *H01M 2/20* | (2006.01) |

(Continued)

(52) U.S. Cl.
CPC ......... *H01M 2/1653* (2013.01); *H01M 2/024* (2013.01); *H01M 2/14* (2013.01); *H01M 2/20* (2013.01); *H01M 2/263* (2013.01); *H01M 10/0431* (2013.01); *H01M 2/0217* (2013.01); *H01M 10/052* (2013.01); *H01M 10/0587* (2013.01)

(58) Field of Classification Search
CPC ............ H01M 2/02; H01M 2/16; H01M 2/18; H01M 2/1653; H01M 2/1686; H01M 10/0525; H01M 10/0587; H01M 4/623; H01M 4/625
See application file for complete search history.

(56) References Cited

U.S. PATENT DOCUMENTS

| | | |
|---|---|---|
| 5,882,362 A | 3/1999 | Muffoletto et al. |
| 2004/0038125 A1 | 2/2004 | Kim et al. |

(Continued)

FOREIGN PATENT DOCUMENTS

| | | |
|---|---|---|
| CN | 104067411 A | 9/2014 |
| DE | 112015002091 T5 | 2/2017 |

(Continued)

*Primary Examiner* — Kenneth J Douyette
(74) *Attorney, Agent, or Firm* — Sughrue Mion, PLLC

(57) ABSTRACT

A battery provided according to the invention includes an electrode body including a positive electrode and a negative electrode, and a battery case. A positive electrode inner terminal is connected to the positive electrode, and a negative electrode inner terminal is connected to the negative electrode. The battery includes, inside the battery case, a first film placed between the electrode body and an inner wall of the battery case, and a second film placed between the battery case and at least one of the negative electrode inner terminal and the positive electrode inner terminal. By the first film and the second film, at least one of the negative electrode inner terminal and the positive electrode inner terminal is insulated from the inner wall of the battery case, and the electrode body is insulated from the inner wall of the battery case.

9 Claims, 8 Drawing Sheets

(51) Int. Cl.
*H01M 2/26* (2006.01)
*H01M 10/04* (2006.01)
*H01M 10/0587* (2010.01)
*H01M 10/052* (2010.01)

(56) References Cited

U.S. PATENT DOCUMENTS

| | | |
|---|---|---|
| 2011/0052975 A1 | 3/2011 | Lee |
| 2011/0195301 A1* | 8/2011 | Taniguchi ............ H01M 2/0262 |
| | | 429/156 |
| 2014/0377607 A1 | 12/2014 | Urano |
| 2017/0047571 A1 | 2/2017 | Iwasaki et al. |

FOREIGN PATENT DOCUMENTS

| | | |
|---|---|---|
| EP | 2808925 A1 | 12/2014 |
| JP | 2010-113816 A | 5/2010 |
| JP | 2011049064 A | 3/2011 |
| JP | 2013-012428 A | 1/2013 |
| JP | 5257697 B2 | 5/2013 |
| JP | 2013161632 A | 8/2013 |
| JP | 2015-41523 A | 3/2015 |
| KR | 10-0472504 B1 | 3/2005 |
| KR | 10-1191661 B1 | 10/2012 |
| WO | 2013/111256 A1 | 8/2013 |

* cited by examiner

BATTERY COMPRISING INSULATIVE FILMS

INCORPORATION BY REFERENCE

The disclosure of Japanese Patent Application No. 2015-077192 filed on Apr. 3, 2015 including the specification, drawings and abstract is incorporated herein by reference in its entirety.

BACKGROUND OF THE INVENTION

1. Field of the Invention

The present invention relates to a battery. More specifically, the present invention relates to a structure of a battery including an electrode body, a battery case in which to accommodate the electrode body, and an insulator film that insulates (isolates) the electrode body from an inner wall of the battery case.

2. Description of Related Art

In recent years, nonaqueous electrolyte secondary batteries such as a lithium-ion secondary battery (lithium secondary battery) and a sodium-ion secondary battery have been used as a so-called portable power supply for a PC, a portable terminal, or the like, and as a vehicle drive power supply because the nonaqueous electrolyte secondary batteries are lightweight and have a high energy density as compared with existing batteries. Particularly, the lithium-ion secondary battery that is lightweight and has a high energy density is preferably used as a high-output power supply for driving vehicles such as an electric vehicle (EV), a hybrid vehicle (HV), and a plug-in hybrid vehicle (PHV).

As this type of battery, there has been known a battery structure including an electrode body configured such that a positive electrode including a positive-electrode active material layer on a positive-electrode current collector and a negative electrode including a negative-electrode active material layer on a negative-electrode current collector are laminated via a separator. In such a battery, respective active material layer non-forming parts that do not include active material layers are provided in respective end portions (that is, end portions of the electrode body) of the positive-electrode current collector and the negative-electrode current collector. A positive electrode inner terminal and a negative electrode inner terminal are connected to the respective active material layer non-forming parts, and those respective inner terminals are electrically connected to a positive electrode external terminal and a negative electrode external terminal for external connections.

Such a battery is generally formed such that an electrode body and a battery case are manufactured separately, and then, the electrode body is accommodated in the battery case. From the viewpoint that a physical strength is large, a metal package is often used as the battery case. In this case, in order to insulate the metal battery case from the electrode body, such a technique is used that the electrode body is insulated (isolated) from an inner wall of the battery case by use of an insulating film, for example. For example, Japanese Patent Application Publication No. 2010-113816 (JP 2010-113816 A) describes a battery including such an insulator film.

In the meantime, the battery including the insulator film is generally formed such that the electrode body and the insulator film are accommodated in the battery case from an opening provided in the battery case (a battery case main body), and then, the opening is sealed (typically, welded) by a cover. At this time, if the insulator film is sandwiched between the opening of the battery case and the cover, poor sealing (poor welding) may occur. Accordingly, a size of the insulator film is typically set to be small, so that the insulator film does not reach the opening of the battery case. In the meantime, if the insulator film the size of which is set to be small as such is used, a region where the electrode body (or an inner terminal connected to the electrode body) is not insulated from the inner wall of the battery case by the insulator film may occur in the vicinity of the opening in the inner wall of the battery case. On this account, in such a non-insulating region, an internal short-circuit may occur between the battery case and the electrode body (or the inner terminal connected to the electrode body). For example, in the non-insulating region, it is conceivable that the battery case and the electrode body (or the inner terminal connected to the electrode body) are electrically connected to each other (make electrical contact with each other) via a foreign matter (e.g., a metallic piece). In the battery configured such that a positive electrode external terminal and a negative electrode external terminal are provided in the cover, the positive electrode inner terminal and the negative electrode inner terminal that electrically connect the external terminals to the electrode body are at least partially placed in the non-insulating region in general. In view of this, such a technique to improve insulating properties between the inner terminals (particularly, parts of the inner terminals, the parts being placed in the non-insulating region) and the battery case has been desired.

SUMMARY OF THE INVENTION

The present invention provides a battery in which an electrode body, a positive electrode inner terminal, and a negative electrode inner terminal are insulated from a battery case by insulator films.

One aspect of the present invention provides a battery including an electrode body including a positive electrode and a negative electrode, and a battery case in which to accommodate the electrode body. Here, the battery case includes a battery case main body having an opening through which the electrode body is accommodated, and a cover that closes the opening of the battery case main body, and a positive electrode external terminal and a negative electrode external terminal are provided on an outer surface of the cover, the outer surface being placed outside the battery case. A positive electrode inner terminal connected to the positive electrode of the electrode body and a negative electrode inner terminal connected to the negative electrode of the electrode body are placed inside the battery case, and the positive electrode inner terminal and the positive electrode external terminal are electrically connected to each other and the negative electrode inner terminal and the negative electrode external terminal are electrically connected to each other. The battery includes, inside the battery case, a first film that is insulative and placed between the electrode body and an inner wall of the battery case main body, and a second film that is insulative and placed between the inner wall of the battery case main body and at least one of the negative electrode inner terminal and the positive electrode inner terminal. By placing the first film and the second film as such, the electrode body is insulated from the inner wall of the battery case main body, and the at least one of the negative electrode inner terminal and the positive electrode inner terminal is insulated (isolated) from the inner wall of the battery case main body.

According to such a configuration, it is possible to provide a battery in which an electrode body, a positive electrode inner terminal, and a negative electrode inner terminal are insulated from an inner wall of a battery case by insulator films. Hereby, it is possible to preferably prevent an internal short-circuit from occurring between the positive electrode inner terminal or the negative electrode inner terminal and the battery case. If the first film is set to a size that allows the first film to insulate (isolate) the opening of the battery case, the electrode body, the positive electrode inner terminal, and the negative electrode inner terminal can be insulated (isolated) from the inner wall of the battery case (the battery case main body) by the first film. However, there is such a concern that the first film with such a size is easy to be sandwiched between the cover and the battery case. As described above, the battery includes the second film inside the battery case separately from the first film, and by the first film and the second film, the positive electrode inner terminal or the negative electrode inner terminal is insulated (isolated) from the inner wall of the battery case, and the electrode body is also insulated (isolated) from the inner wall of the battery case. Hereby, it is possible to prevent an insulator film (the first film) from being sandwiched between the battery case and the cover, while securing insulating properties of the electrode body, the positive electrode inner terminal, and the negative electrode inner terminal from the battery case.

Here, in the present specification, the "insulator film" is not limited to a specific thickness, but includes a thin film that is relatively thin, and a sheet-shaped insulator sheet that is relatively thick and can be suitably called "sheet," for example.

In one preferred aspect of the battery disclosed herein, as the second film, the battery may separately include a third film placed between the negative electrode inner terminal and the battery case main body, and a fourth film placed between the positive electrode inner terminal and the battery case main body. According to such a configuration, the negative electrode inner terminal and the positive electrode inner terminal can be both insulated (isolated) from the inner wall of the battery case (the battery case main body). Further, the third film can be a film having a relatively simple shape. This is preferable because the second film (that is, the third film and the fourth film) is easy to be placed inside the battery case and is also easy to be manufactured.

In one preferred aspect of the battery disclosed herein, as the second film, the battery may include a fifth film placed between the battery case main body and both of the negative electrode inner terminal and the positive electrode inner terminal. According to such a configuration, the negative electrode inner terminal and the positive electrode inner terminal can be both insulated (isolated) from the inner wall of the battery case (the battery case main body) by the first film and a single fifth film. This can improve workability to place the second film (the fifth film) inside the battery case.

In one preferred aspect of the battery disclosed herein, a part of the first film may be placed so as to overlap with a part of the second film, and in their overlapping part, the first film may be placed closer to the battery case main body than the second film. According to such a configuration, due to the overlapping part, it is possible to prevent the positive electrode inner terminal and the negative electrode inner terminal from being exposed without being insulated (isolated) by the insulator film, and it is possible to surely isolate (insulate) the electrode body, the positive electrode inner terminal, and the negative electrode inner terminal from the inner wall of the battery case. Further, according to the above configuration, since the second film can be placed so as to be distanced from a joining part between the battery case main body and the cover, even if the second film is misaligned at the time when the second film is placed inside the battery case, it is possible to prevent the second film from being sandwiched between the battery case and the cover.

In one preferred aspect of the battery disclosed herein, an overlapping width of the overlapping part between the first film and the second film may be not more than 1 mm. According to the above configuration, it is possible to isolate the electrode body, the positive electrode inner terminal, and the negative electrode inner terminal from the inner wall of the battery case by a minimum first film and a minimum second film. Such a configuration is preferable from the viewpoint of cost reduction in manufacturing the battery. Further, such a configuration is also preferable in that a space occupied by the first film and the second film in the battery case can be minimized.

Further, in one preferred aspect of the battery disclosed herein, the electrode body is a flat wound electrode body having a rectangular wide surface, and the battery case is constituted by a square battery case main body having an opening through which the flat wound electrode body is accommodated, and a cover that closes the opening of the battery case main body. The positive electrode inner terminal and the negative electrode inner terminal are placed at different end portions, in a lengthwise direction, of the wide surface of the electrode body, and each of the positive electrode inner terminal and the negative electrode inner terminal includes a current collector tab attached to the electrode body, a current collector plate electrically connected to an external connection terminal provided in the cover, and a connection portion that connects the current collector plate to the current collector tab. Further, the second film is placed between the connection portion of the negative electrode inner terminal and the inner wall of the battery case main body, and/or between the connection portion of the positive electrode inner terminal and the inner wall of the battery case main body. In the battery configured as described above, typically, in the negative electrode inner terminal and the positive electrode inner terminal, the connection portion of the positive electrode inner terminal and the connection portion of the negative electrode inner terminal are placed closest to the inner wall of the battery case. In view of this, according to the configuration, it is possible to reduce a risk of an occurrence of an internal short-circuit between the battery case and each of the positive electrode inner terminal and the negative electrode inner terminal.

In one preferred aspect of the battery disclosed herein, the third film and the fourth film may be formed from the same material into the same shape (that is, the same size and the same outer shape). With such a configuration, the same film can be used as the third film and the fourth film, thereby making it possible to reduce a cost in manufacturing the third film and the fourth film.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
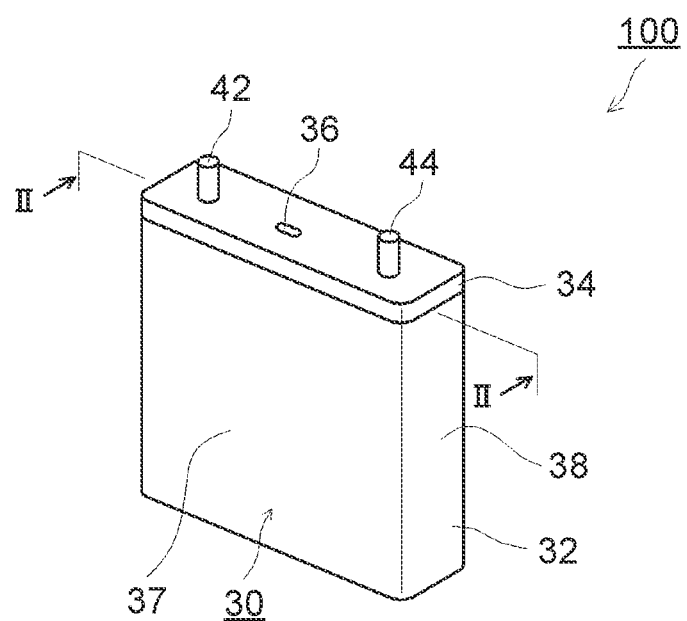
FIG. 1 is a perspective view schematically illustrating an outer shape of a nonaqueous electrolyte secondary battery according to one embodiment of the present invention.

Preferred embodiments of the present invention will be hereinafter described with reference to the attached drawings. Note that a matter that is not particularly mentioned in the present specification but is necessary for execution of the present invention can be understood as a design matter of a person skilled in the art based on related art. The present invention can be performed based on what is described in the present specification and a common general technical knowledge in the art. Note that, in the following drawings, a description is made by assigning the same reference sign to members/parts that yield the same effect, and a redundant description is omitted or simplified. Further, a dimensional relationship (length, width, thickness, and the like) in each drawing does not necessarily show an actual dimensional relationship.

Note that a "secondary battery" in the present specification indicates a general electrical storage device that is chargeable and dischargeable repeatedly, and is a term that covers a storage battery such as a lithium-ion secondary battery and a storage element such as an electric double layer capacitor. Further, a "nonaqueous electrolyte secondary battery" indicates a battery including a nonaqueous electrolyte (typically, an electrolyte solution in which a supporting salt (supporting electrolyte) is contained in a nonaqueous solvent). Further, a "lithium-ion secondary battery" indicates a secondary battery that uses lithium ions as charge carriers and performs charging and discharging by migration of lithium ions between positive and negative electrodes. Further, an "electrode active material" indicates a material that can reversibly store and release chemical species (lithium ions in the lithium-ion secondary battery) serving as charging carriers. The following more specifically describes a structure of a battery of the present invention by taking, as an example, a lithium-ion secondary battery. However, it is not intended to limit the present invention to what is described in the following embodiments.

A nonaqueous electrolyte secondary battery described herein includes, inside a battery case, an electrode body, and a positive electrode inner terminal and a negative electrode inner terminal both connected to the electrode body. In the battery case, an insulating film A, which is an insulating film and placed between the electrode body and an inner wall of the battery case, and an insulating film B, which is placed between the inner wall of the battery case (a battery case main body) and at least one of the positive electrode inner terminal and the negative electrode inner terminal connected to the electrode body (typically between the positive electrode inner terminal or the negative electrode inner terminal and the film A), are provided. By the film A and the film B, the electrode body is insulated (isolated) from the inner wall of the battery case, and at least one of the negative electrode inner terminal and the positive electrode inner terminal is insulated (isolated) from the inner wall of the battery case. In other words, by the film A and the film B, it is possible to reduce a possibility (a possibility of a so-called internal short-circuit) that the electrode body is electrically connected to (comes in contact with) the inner wall of the battery case, and a possibility (a possibility of a so-called internal short-circuit) that the negative electrode inner terminal or the positive electrode inner terminal is connected to (comes in contact with) the inner wall of the battery case. Typically, the wound electrode body is insulated (isolated) from the inner wall of the battery case (the battery case main body) by the film A, and a part of the negative electrode inner terminal and a part of the positive electrode inner terminal are insulated (isolated) from the inner wall of the battery case (the battery case main body) by the film A. Further, typically, at least one of the negative electrode inner terminal (typically, in the negative electrode inner terminal, a part that is not insulated from the battery case by the film A) and the positive electrode inner terminal (typically, in the positive electrode inner terminal, a part that is not insulated from the battery case by the film A) is insulated (isolated) from the inner wall of the battery case (the battery case main body) by the film B. Note that the film A and the film B are not limited to a configuration that isolates the negative electrode inner terminal, the positive electrode inner terminal, and the whole electrode body (a whole surface thereof) from the inner wall of the battery case (typically, a configuration that covers the negative electrode inner terminal, the positive electrode inner terminal, and the whole electrode body (the whole surface thereof)). The film A and the film B may have such a configuration (typically, a configuration that covers a desired part of the negative electrode inner terminal, the positive electrode inner terminal, and the electrode body) that a desired part of the negative electrode inner terminal, the positive electrode inner terminal, and the electrode body (generally, a part having a large opposed area to the battery case, a part placed close to the inner wall of the battery case (the battery case main body), a part where an internal short-circuit with the battery case is easy to occur, and the like part) is isolated from an inner part of the battery case.

<First Embodiment> The following describes one preferred embodiment (a first embodiment) of the present invention. The embodiment deals with a battery that separately includes, as the film B, a film $B_N$ placed between the negative electrode inner terminal and the inner wall of the battery case (the battery case main body), and a film $B_P$ placed between the positive electrode inner terminal and the inner wall of the battery case (the battery case main body).

Figure 2:
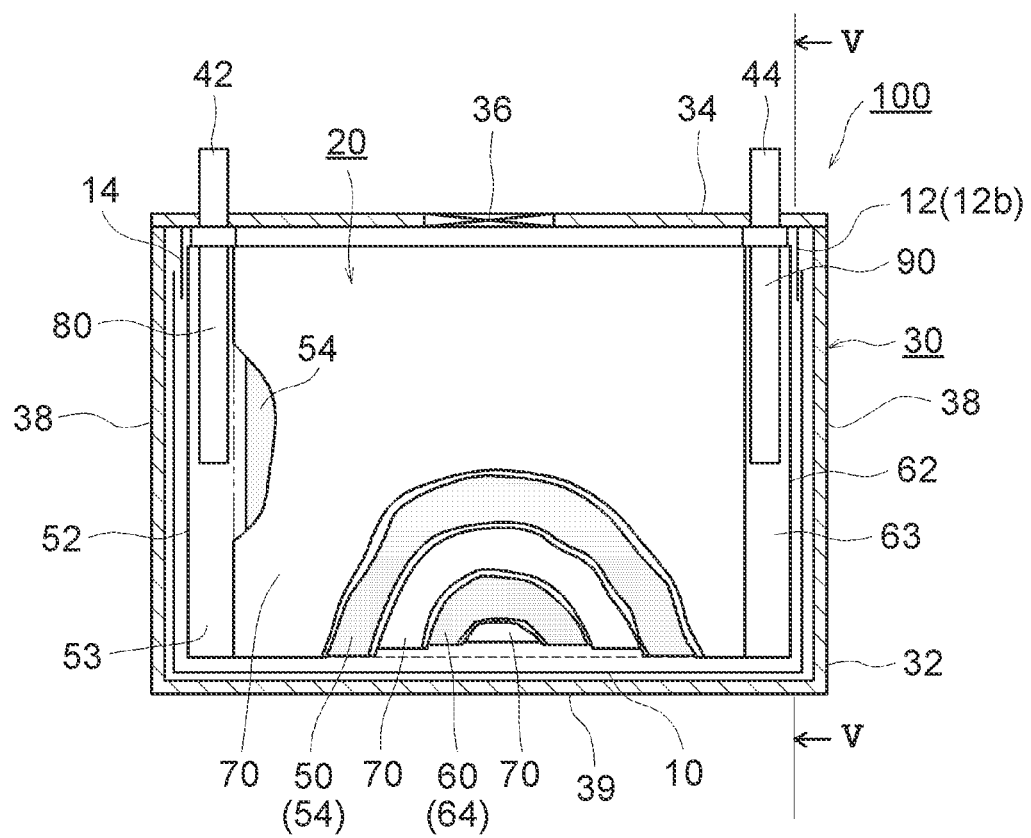
FIG. 2 is a drawing of a longitudinal section schematically illustrating a sectional structure taken along a line II-II in FIG. 1.
Figure 5:
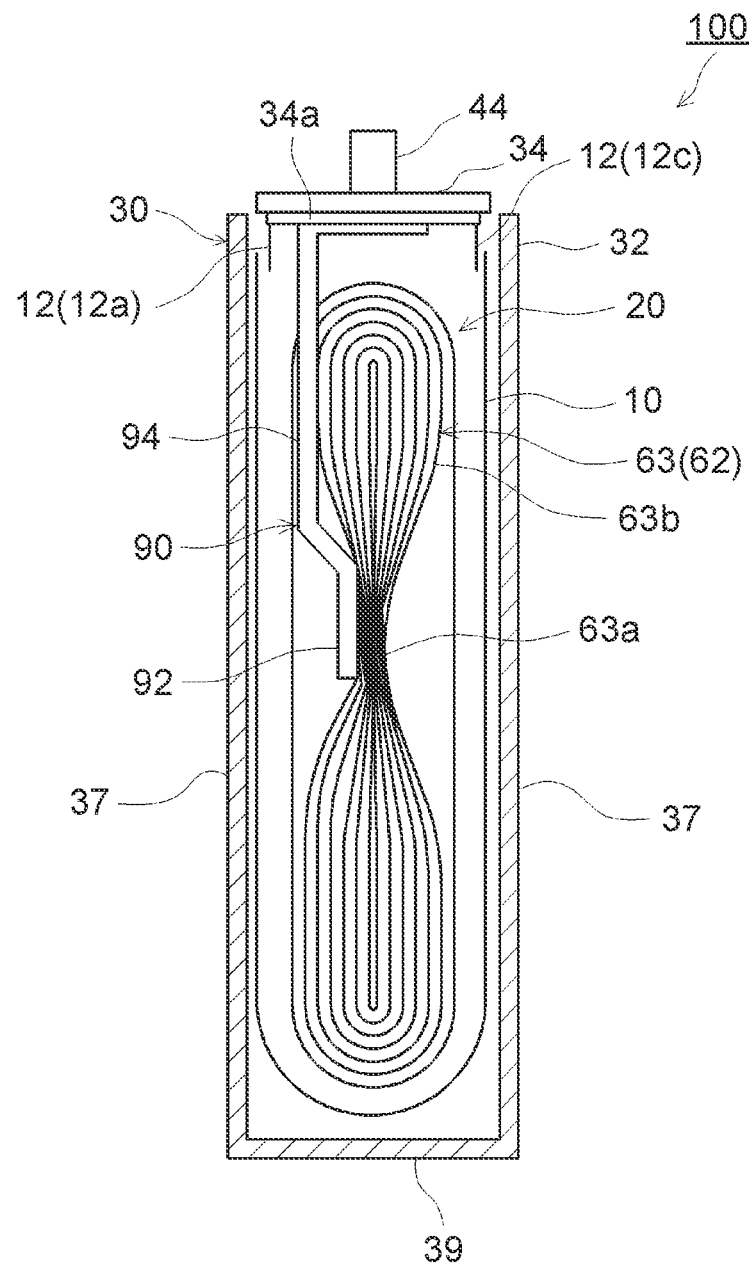
FIG. 5 is a drawing of a longitudinal section schematically illustrating a sectional structure along a line V-V in FIG. 2, and a side view schematically illustrating an arrangement of the electrode body, the negative electrode inner terminal, a film A, and a film $B_N$ in the nonaqueous electrolyte secondary battery according to one embodiment.

A schematic configuration of a lithium-ion secondary battery according to one embodiment of the present invention is illustrated in FIGS. 1, 2, and 5. FIG. 1 is a perspective view schematically illustrating an outer shape of a lithium-ion secondary battery 100. FIG. 2 is a drawing of a longitudinal section schematically illustrating a sectional structure taken along a line II-II in the lithium-ion secondary battery 100 illustrated in FIG. 1. Further, FIG. 5 is a drawing of a longitudinal section schematically illustrating a sectional structure taken along a line V-V in the lithium-ion secondary battery 100 illustrated in FIG. 2. As illustrated in FIGS. 1, 2, and 5, the lithium-ion secondary battery 100 disclosed herein includes, in a battery case 30, an electrode body 20, and insulator films (a film A10, a film $B_N12$, a film $B_P14$). The electrode body 20 in the present invention can be a laminated-type electrode body or a wound-type electrode body, for example. Although it is not intended to limit the present invention particularly, a flat wound-type electrode body (a wound electrode body) 20 is described as an example.

<<Battery Outer Case 30>> As illustrated in FIGS. 1, 2, and 5, the battery case 30 of the present embodiment is a square-shaped (typically, rectangular solid) battery case having eight corners in total, and is formed so that its internal space has a rectangular shape corresponding to the wound electrode body 20. The battery case 30 includes a battery case main body 32 and a cover 34. The battery case main body 32 is a flat box-like container having a bottomed rectangular-solid shape and having an opening in one end (corresponding to an upper end thereof in a usual usage state of the battery). The cover 34 is a member attached to the opening (the opening at the upper end) of the battery case main body 32 so as to close the opening. The battery case main body 32 can accommodate therein the wound electrode body 20 and the insulator films through the opening at the upper end. As illustrated in FIGS. 1, 2, and 5, the battery case main body 32 is constituted by a pair of wide surfaces 37 opposed to flat surfaces (flat portions) of the wound electrode body 20 accommodated in the case, a pair of narrow surfaces 38 adjacent to the wide surfaces 37, and a bottom face 39. A lightweight metal material (e.g., aluminum, stainless steel, nickel plating steel, and the like) having a high strength and a good thermal conductivity is preferable as a material of the battery case 30.

The battery case 30 has a flat rectangular internal space as a space in which to accommodate the wound electrode body 20. Further, as illustrated in FIG. 2, a lateral width (a length of the wide surface 37 along a long-side direction) of the flat internal space of the battery case 30 is slightly wider than the wound electrode body 20. Further, as illustrated in FIGS. 1, 2, and 5, a positive electrode external terminal 42 and a negative electrode external terminal 44 for external connections are attached to an outer surface of the cover 34 of the battery case 30, the outer surface being placed (positioned) outside the battery case 30. The positive electrode external terminal 42 and the negative electrode external terminal 44 penetrate through the battery case 30 (the cover 34) so as to project outside the battery case 30. Further, the cover 34 is provided with a thin relief valve 36 set to relieve an internal pressure of the battery case 30, and an inlet (not shown) to pour a nonaqueous electrolyte (typically, a nonaqueous electrolyte solution) therethrough.

Figure 3:
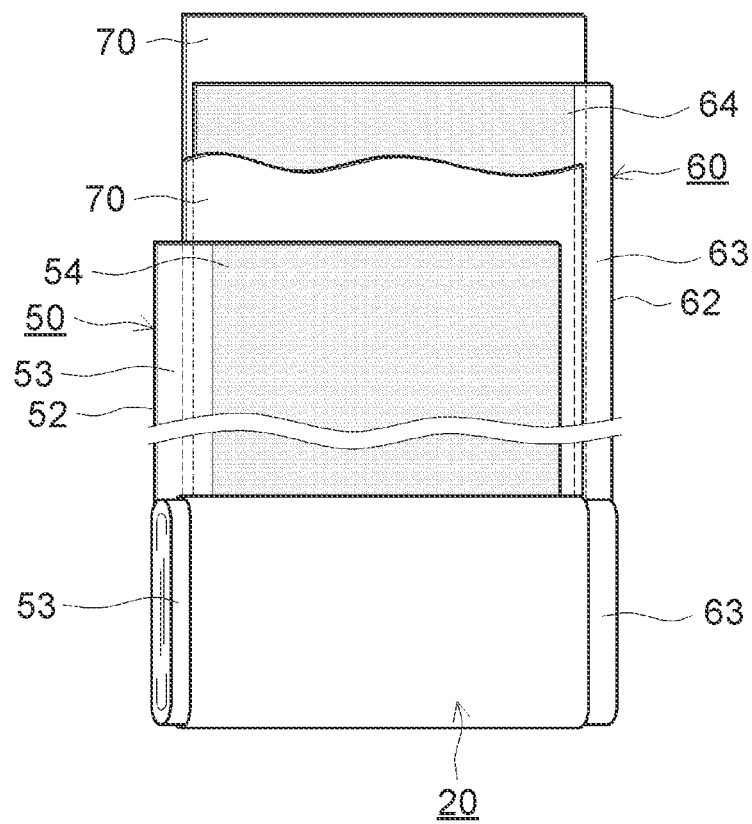
FIG. 3 is a schematic view illustrating a configuration of a wound electrode body according to one embodiment.

<<Wound Electrode Body 20>> FIG. 3 is a schematic view illustrating a configuration of the wound electrode body 20 illustrated in FIGS. 2 and 5. As illustrated in FIG. 3, the wound electrode body 20 according to the present embodiment has an elongated sheet structure (a sheet-shaped electrode body) at a stage prior to assembly. The wound electrode body 20 is formed in a flat shaped such that a positive electrode (a positive-electrode sheet) 50 and a negative electrode (a negative-electrode sheet) 60 are laminated via an elongated separator (a separator sheet) 70 and wound in a lengthwise direction, and then pressed from a side surface direction so as to be flattened. The positive electrode 50 is configured such that a positive-electrode active material layer 54 is formed on one surface or both surfaces (both surfaces herein) of an elongated positive-electrode current collector 52 along a longitudinal direction. The negative electrode 60 is configured such that a negative-electrode active material layer 64 is formed on one surface or both surfaces (both surfaces herein) of an elongated negative-electrode current collector 62 along a longitudinal direction. That is, as illustrated herein, the wound electrode body 20 in the flat shape is constituted by two curved portions, which are both longitudinal end portions of a section of the wound electrode body 20 perpendicular to a winding axis of the wound electrode body 20 and configured such that their electrode-body surfaces are curved, and a wide flat portion (a flat surface), which is placed in a longitudinal center part of the section of the wound electrode body 20 and sandwiched between the two curved portions. Further, as illustrated in FIGS. 2, 3, and 5, the wound electrode body 20 is accommodated in the battery case 30 (that is, a battery case main body 32) so that a longitudinal direction of the section of the wound electrode body 20 perpendicular to the winding axis of the wound electrode body 20 is along an up-down direction of the battery case 30 (in a posture in which the winding axis of the wound electrode body 20 is laid down, that is, the opening is formed in a normal-line direction of the winding axis of the wound electrode body 20) and one curved portion out of the two curved portions is opposed to the bottom face 39 of the battery case. Here, in the wound electrode body, the curved portion that is opposed to the bottom face 39 of the battery case 30 (the battery case main body 32) is referred to as a lower curved portion.

Figure 4:
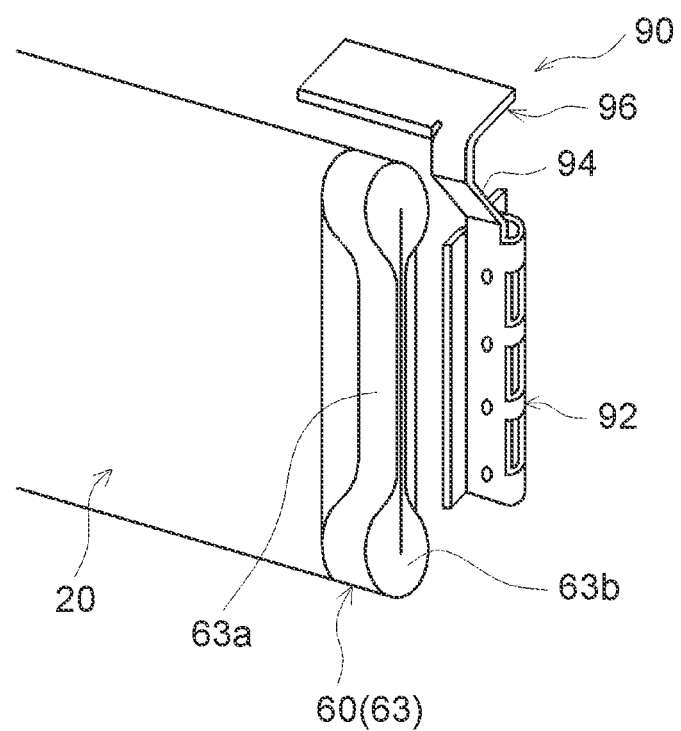
FIG. 4 is a view schematically illustrating a structure of a negative electrode inner terminal in the nonaqueous electrolyte secondary battery according to one embodiment, and a relationship between the negative electrode inner terminal and an electrode body.

As illustrated in FIG. 3, at the time of lamination, the positive-electrode sheet 50 and the negative-electrode sheet 60 are laminated so as to be shifted from each other in a width direction such that: a positive-electrode active material layer non-forming part (that is, a part where positive-electrode active material layer 54 is not formed and the positive-electrode current collector 52 is exposed) 53 of the positive-electrode sheet 50 partially projects in one end (on the left side in the figure) of the wound electrode body 20; and a negative-electrode active material layer non-forming part (that is, a part where negative-electrode active material layer 64 is not formed and the negative-electrode current collector 62 is exposed) 63 of the negative-electrode sheet 60 partially projects in the other end (on the right side in the figure) of the wound electrode body 20. As a result, a laminating portion in which the positive-electrode sheet 50, the negative-electrode sheet 60, and the separator sheet 70 are laminated and wound is formed in a central part of the wound electrode body 20, and the positive-electrode active material layer non-forming part 53 and the negative-electrode active material layer non-forming part 63 in which the positive-electrode and negative-electrode active material layer non-forming parts (53, 63) partially protrude outwardly from the laminating portion are formed at both ends of the wound electrode body 20 in a winding-axis direction. As illustrated in FIGS. 2, 4, 5, a positive electrode inner terminal 80 and a negative electrode inner terminal 90 are joined, by ultrasonic welding, resistance welding, or the like, to the positive-electrode active material layer non-forming part 53 and the negative-electrode active material layer non-forming part 63, respectively. That is, the positive electrode inner terminal 80 and the negative electrode inner terminal 90 are placed in different end portions, in a lengthwise direction, of the wide surface of the electrode body 20. As illustrated in the figure, the positive electrode inner terminal 80 and the negative electrode inner terminal 90 are electrically connected to the positive electrode external terminal 42 and the negative electrode external terminal 44, respectively.

<<Positive Electrode Inner Terminal 80 and Negative Electrode Inner Terminal 90>> As illustrated in FIGS. 4 and 5 (here, the negative electrode inner terminal 90 is illustrated), each of the positive electrode inner terminal 80 and the negative electrode inner terminal 90 includes: a current collector tab 92 attached to the electrode body 20 (typically, the negative-electrode active material layer non-forming part 63); a current collector plate 96 electrically connected to the negative electrode external terminal 44 provided in the cover 34; and a connection portion 94 that connects the current collector plate 96 to the current collector tab 92. Since the negative electrode inner terminal 90 and the positive electrode inner terminal 80 can have the same shape, the following description is made by taking the negative electrode inner terminal 90 as an example. In this example, as illustrated in FIGS. 4 and 5, the negative-electrode active material layer non-forming part 63 is constituted by a thinned part 63a formed by gathering the negative-electrode active material layer non-forming part 63 in a thickness direction of the wound electrode body 20 so that its thickness is reduced; and a thickened part 63b that is relatively thick in comparison with the thinned part 63a. The current collector tab 92 is joined (here, by welding) to the thinned part 63a (typically, a central part of the negative-electrode active material layer non-forming part 63). Then, the connection portion 94 is bent and extended upward (that is, a direction toward the cover 34) from the current collector tab 92 along an outer shape of the thickened part 63b. Further, a negative-electrode current collector plate 96 is provided in an upper tip (an end portion reverse to the current collector tab 92) of the connection portion 94. That is, in the battery according to the present embodiment, the connection portion 94 in the negative electrode inner terminal 90 is placed at a position closest to an inner wall of the battery case 30 (the battery case main body 32) as illustrated in FIG. 5.

Here, the connection portion 94 that constitutes the negative electrode inner terminal 90 and a connection portion constituting the positive electrode inner terminal 80 may be provided in the same flat portion (flat surface) out of two flat portions (flat surfaces) of the electrode body 20, or may be provided in different flat portions (flat surfaces). From the viewpoint of working efficiency at the time when the inner terminals are attached to the electrode body 20, it is preferable that the positive electrode inner terminal 80 and the negative electrode inner terminal 90 be provided in the same flat portion (flat surface) out of the flat portions (flat surfaces) of the electrode body 20.

Materials to form the positive electrode inner terminal 80 and the negative electrode inner terminal 90 are not limited in particular, provided that the materials are excellent in electric conductivity (typically, metal). A preferable example of the material to form the positive electrode inner terminal 80 is aluminum or alloy mainly containing aluminum, for example, and a preferable example of the material to form the negative electrode inner terminal 90 is copper and alloy mainly containing copper, for example.

<<Insulator Film>> As illustrated in FIGS. 2 and 5, the battery according to the present embodiment (the first embodiment) is configured such that an insulating film (an insulator film) that insulates (isolates) the wound electrode body 20, the positive electrode inner terminal 80, and the negative electrode inner terminal 90 from the battery case 30 (the battery case main body 32) is placed inside the battery case 30. More specifically, an insulating film A10 placed between the wound electrode body 20 and the inner wall of the battery case 30 (the battery case main body 32), an insulating film $B_N12$ placed between the negative electrode inner terminal 90 and the inner wall of the battery case 30 (the battery case main body 32) (typically, between the negative electrode inner terminal 90 and the film A10), and an insulating film $B_P14$ placed between the positive electrode inner terminal 80 and the inner wall of the battery case 30 (the battery case main body 32) (typically, between the positive electrode inner terminal 80 and the film A10) are provided. Due to the insulator films (that is, the film A10, the film $B_N12$, and the film $B_P14$), the wound electrode body 20 as a power generation element, and the negative electrode inner terminal 90 and the positive electrode inner terminal 80 each made of a material excellent in electric conductivity are insulated (isolated) from the battery case 30 (the battery case main body 32), thereby making it possible to secure insulation of the wound electrode body 20, the negative electrode inner terminal 90, and the positive electrode inner terminal 80 from the battery case 30.

A material of the insulator film, that is, the film A10 and the film B (here, the film $B_N12$ and the film $B_P14$) may be a material that can function as an insulating member. For example, a resin material, typically, olefin resin can be preferably used. A resin material such as polypropylene (PP) and polyethylene (PE) is preferable as the material to form the insulator film. Typically, the film B (here, the film $B_N12$ and the film $B_P14$) is placed in the vicinity of the opening of the battery case main body 32, which may cause deformation, break, and the like of the film due to heat generated at the time when the battery case main body 32 and the cover 34 are welded. In view of this, as a material of the film B (here, the film $B_N12$ and the film $B_P14$), a material made of a material having excellent heat resistance is preferable. Note that the insulator films, that is, the film A10 and the film B (here, the film $B_N12$ and the film $B_P14$) may have a single layer structure or may have a laminated structure with two or more layers (e.g., a structure in which layers made of different materials are laminated) as long as the effect of the present invention can be obtained. The film A10 and the film B (here, the film $B_N12$ and the film $B_P14$) may be made of different materials or may be made of the same material. Typically, a film made of the same material can be used for them.

Respective average thicknesses of the insulator films, that is, the film A10 and the film B (here, the film $B_N12$ and the film $B_P14$) may be around 100 μm, but can be changed appropriately according to configuration conditions of the battery 100. For example, the average thicknesses can be not less than 20 μm (preferably, not less than 50 μm) but not more than 200 μm (preferably, not more than 100 μm). A thin insulator film is preferable because the thin insulator film can minimize a space occupied by the insulator films in the battery case 30 at the time when the insulator films are accommodated in the battery case 30. On the other hand, if the thicknesses of the insulator films are too thin, durability of the insulator films decreases, which may make it difficult to secure the insulation of the electrode body 20, the positive electrode inner terminal 80, and the negative electrode inner terminal 90 from the battery case 30. The film A10 and the film B (here, the film $B_N$12 and the film $B_P$14) may be made of films having different average thicknesses or may be made of films having the same average thickness. Typically, the films having the same average thickness can be used.

<<Film A10>> Here, a shape of the film A10 is not limited in particular provided that the negative electrode inner terminal 90, the positive electrode inner terminal 80, and the electrode body 20 can be insulated from the inner wall of the battery case 30 (the battery case main body 32) by the film A and the film B (typically, the film $B_N$12 and the film $B_P$14). Typically, the film A10 can have a shape that can insulate (isolate) the electrode body 20 from the battery case 30 (the battery case main body 32). Note that the film A is not limited to a configuration (typically, a configuration that covers a whole surface of the electrode body 20) that isolates a whole surface of the electrode body 20 from the inner wall of the battery case 30, but may be a configuration (typically, a configuration that covers a desired part of the electrode body 20) in which a desired part of the electrode body 20 (generally, a part having a large opposed area to the battery case, a part where an internal short-circuit with the battery case is easy to occur, and the like part) is isolated from an inner part of the battery case by the film A and the film B (typically, the film $B_N$12 and the film $B_P$14). For example, the film A10 can have a shape that isolates at least a planar surface portion or the lower curved portion of the electrode body 20 from the inner wall of the battery case 30, the inner wall being opposed to them (typically, a shape that covers either of the planar surface portion or the lower curved portion of the electrode body 20). The film A10 preferably has a shape that isolates at least the above two portions of the electrode body 20, i.e., the planar surface portion and the lower curved portion, from the inner wall of the battery case 30, the inner wall being opposed to them (typically, a shape that covers the above two portions of the electrode body 20, i.e., the planar surface portion and the lower curved portion). For example, the film A10 can have a shape in which a rectangular insulator film is bent (or curved) along the lower curved portion of the electrode body 20 (a portion thereof opposed to the bottom face 39 of the battery case 30 at the time when the electrode body 20 is inserted into the battery case 30), or a pouch-like shape having a bottom, the pouch-like shape is corresponding to the shape of the electrode body 20. From the viewpoint of securing, at a high level, the insulation between the electrode body 20 and the inner wall of the battery case 30 (the battery case main body 32), it is preferable that the shape of the film A10 be the pouch-like shape having the bottom, the pouch-like shape is corresponding to the shape of the electrode body 20. Typically, the film A10 can have a pouch-like shape having a bottom in which one end (corresponding to an upper end in a usual usage state of the battery, that is, an end portion corresponding to the opening of the battery case main body 32 at the time when the film A10 is inserted into the battery case main body 32) is opened, and the wound electrode body 20 can be accommodated therein via such an opening. Typically, the film A is formed to have a size that does not allow the film A to reach the opening (the opening in the upper end) of the battery case main body 32 at the time when the film A is placed inside the battery case main body 32.

As illustrated in FIGS. 2 and 5, roughly speaking, the film A10 in a pouch-like shape is constituted by: wide surface forming portions that form a pair of wide surfaces opposed to the wide surfaces 37 of the battery case 30 (the battery case main body 32) (flat portions of the wound electrode body 20, the flat portions being opposed to the wide surfaces 37); a bottom face forming portion that is placed between the pair of wide surface forming portions and forms a bottom face of the film A10, the bottom face being opposed to the bottom face 39 of the battery case 30 (the battery case main body 32) (the lower curved portion of the wound electrode body 20, the lower curved portion being opposed to the bottom face 39); and narrow surface forming portions that are placed on both sides of the pair of wide surface forming portions and form a pair of narrow surfaces opposed to the narrow surfaces 38 of the battery case 30 (the battery case main body 32).

A shape of the bottom face forming portion (that is, a portion opposed to the lower curved portion of the wound electrode body 20) of the film A10 in a pouch-like shape is not limited in particular, and can be a U-shape, a V-shape, or a lateral U-shape, for example. The shape of the bottom face forming portion of the film A10 is preferably a gradually curved shape (U-shape) in which the bottom face forming portion is curved as illustrated in FIG. 5, and especially, a shape corresponding to (preferably, similar to) the shape of the lower curved portion of the wound electrode body 20. Hereby, the bottom face forming portion of the film A10 can be formed in a shape closer to the shape of the wound electrode body 20, that is, in a shape similar to a shape of the curved portions formed at both ends of the wound electrode body 20 in a direction along the winding direction. This makes it possible to minimize a gap that can occur between the electrode body 20 and the bottom face forming portion of the film A10. As a result, it is possible to prevent a displacement or the like of the film A10 at the time when the electrode body 20 and the film A10 are accommodated into the battery case 30 (the battery case main body 32), thereby making it possible to secure, at a high level, the insulation between the electrode body 20 and the battery case 30 (the battery case main body 32).

The film A10 in such a pouch-like shape can be formed such that a film cut in a predetermined shape is bent in the above-described shape and assembled in a pouch-like shape, for example. At this time, for example, the film can be formed in a pouch-like shape such that the film is cut in a shape (typically, a shape in which the insulator film in the pouch-like shape is unfolded) in which parts (typically, parts of the narrow surface forming portions) overlap with each other at the time when the film is assembled in the pouch-like shape, and the overlapping parts are stuck together (fixed). Alternatively, a plurality of sheets (parts) may be combined (stuck together) so as to be formed in the pouch-like shape. Note that, in a case where the insulator films are stuck together, a welding technique such as ultrasonic welding or laser beam welding can be used appropriately, as well as spot welding or heat welding. Alternatively, the insulator films may be fixed by use of a sticker, an adhesive, or the like as far as they can be fixed sufficiently and battery performance is not affected by any adverse effect (an internal short-circuit or the like).

<<Film $B_N$12>> The insulating film $B_N$12 is placed between the negative electrode inner terminal 90 and the battery case 30 (the battery case main body 32) (typically, between the negative electrode inner terminal 90 and the film A). The insulating film $B_N$12 and the film A realize insulation (isolation) between the negative electrode inner terminal 90 and the inner wall of the battery case 30 (the battery case main body 32). A shape of the film $B_N$12 is not limited in particular provided that the film $B_N$12 and the film A can realize the insulation between the negative electrode inner terminal 90 and the inner wall of the battery case 30 (the battery case main body 32). Typically, the film $B_N$12 can have a shape that can insulate (isolate) the negative electrode inner terminal 90 from the battery case 30 (the battery case main body 32). Note that the film $B_N$12 is not limited to a configuration that isolates a whole surface of the negative electrode inner terminal 90 from the inner wall of the battery case 30 (the battery case main body 32) (typically, a shape that covers the whole surface of the negative electrode inner terminal 90), but may be a configuration in which a desired part of the negative electrode inner terminal 90 (generally, a part placed closer to the battery case, a part where an internal short-circuit with the battery case is easy to occur, and the like part) can be isolated from the inner wall of the battery case (the battery case main body) by the film $B_N$12 and the film A (typically, a configuration to cover the desired part of the negative electrode inner terminal 90).

For example, the film $B_N$12 can have a shape (for example, a planar shape) that can cover at least a part of the connection portion 94 of the negative electrode inner terminal 90, the part being not covered with the film A10. That is, the film $B_N$12 can have a shape having a connection portion covering surface 12a placed between at least the connection portion 94 of the negative electrode inner terminal 90 and the wide surface 37 of the battery case 30 (the battery case main body 32). Hereby, it is possible to secure insulation between the connection portion 94, in the negative electrode inner terminal 90, placed closest to the battery case 30 (the battery case main body 32) from the inner wall of the battery case 30 (the battery case main body 32).

The film $B_N$12 preferably has a shape that can cover a part of the negative electrode inner terminal 90 (including the current collector tab 92 and the connection portion 94), the part being not covered with the film A10. That is, the film $B_N$12 can have a shape having the connection portion covering surface 12a, and a current collector tab covering surface 12b placed between the current collector tab 92 of the negative electrode inner terminal 90 and the narrow surface 38 of the battery case main body 32. For example, the film $B_N$12 can have a shape bent in an L-shape so as to cover the connection portion 94 and the current collector tab 92. Hereby, it is possible to secure, at a high level, the insulation between the negative electrode inner terminal 90 and the inner wall of the battery case 30 (the battery case main body 32).

Figure 6:
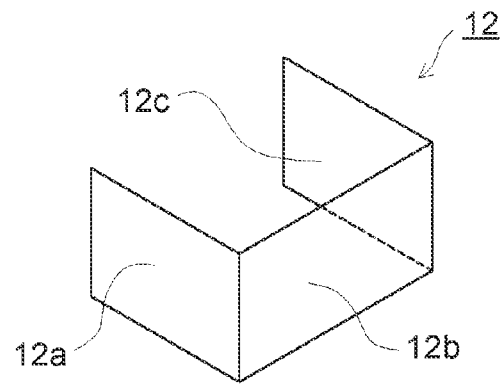
FIG. 6 is a perspective view schematically illustrating a configuration of the film $B_N$ according to one embodiment.

Alternatively, the shape of the film $B_N$12 is preferably a shape that can cover a part of the negative-electrode active material layer non-forming part 63 of the negative-electrode current collector, the part being not covered with the film A10, in addition to the negative electrode inner terminal 90. That is, the film $B_N$12 can have a shape having the connection portion covering surface 12a, the current collector tab covering surface 12b, and a negative-electrode active material layer non-forming part covering surface 12c placed between the negative-electrode active material layer non-forming part 63 on a side where the connection portion 94 is not placed and the wide surface 37 of the battery case main body 32. When the negative-electrode active material layer non-forming part 63 is electrically connected to the battery case 30 (the battery case main body 32) via a foreign matter (e.g., a metallic piece) or the like, an internal short-circuit may occur. However, according to the above configuration, since the negative-electrode active material layer non-forming part 63 is covered with the film $B_N$12, it is possible to secure insulation between the negative-electrode active material layer non-forming part 63 and the inner wall of the battery case 30 (the battery case main body 32). Such a shape of the film $B_N$12 can be a shape bent in a laterally U-shape so as to cover the connection portion 94 and the current collector tab 92 of the negative electrode inner terminal 90, and the negative-electrode active material layer non-forming part 63. Such a shape of the film $B_N$12 can be a shape bent in a laterally U-shape so as to cover the connection portion 84 and the current collector tab 82 of the positive electrode inner terminal 80, and the positive-electrode active material layer non-forming part 53. The shape of the film $B_N$ having such a laterally U-shape is illustrated in FIG. 6.

The film $B_N$12 in the above shape (for example, a planar shape, an L-shape, a laterally U-shape) can be manufactured such that an insulator film cut with an appropriate size is bent in a predetermined shape, for example.

As illustrated in FIGS. 2 and 5, the film $B_N$12 is placed inside the battery case 30 so as to insulate (isolate) the negative electrode inner terminal 90 from the inner wall of the battery case 30 (the battery case main body 32). For example, by fixing the film $B_N$12 to an inner side of the cover 34 (a side placed inside the battery case at the time when the battery case 30 is formed, namely, a side opposed to the electrode body 20 at the time when the battery case 30 is formed), the film $B_N$12 can be placed at a predetermined position in the battery case 30. In general, an insulating member 34a is placed in a part of the inner side of the cover 34 so as to avoid the contact (electric connection) between the cover 34 and the inner terminal. The part of the inner side of the cover 34 is opposed to the inner terminal. That is, the cover 34 can be constituted by at least a cover main body and the insulating member 34a placed on the inner side thereof. It is preferable that the film $B_N$12 be fixed to the insulating member 34a. Hereby, the film $B_N$12 can be placed at a position distanced from a joining part between the battery case main body 32 and the cover 34, thereby making it possible to decrease troubles such as deformation of the film $B_N$12, the troubles being caused due to heat generated at the time when the battery case main body 32 and the cover 34 are welded. Here, a method of fixing the film $B_N$12 to the cover 34 (typically, the insulating member 34a placed on the inner side of the cover 34) is not limited in particular, provided that the cover 34 and the film $B_N$12 can be connected to each other so as not to be separated from each other. For example, the film $B_N$12 can be fixed to the cover 34 by welding (also referred to as fusing), more specifically, a welding technique such as ultrasonic welding or laser beam welding, as well as spot welding or heat welding. Alternatively, the film $B_N$12 may be fixed by use of a sticker, an adhesive, or the like as far as the film $B_N$12 can be fixed sufficiently and battery performance is not affected by any adverse effect (an internal short-circuit or the like). A method of placing the film $B_N$12 at a predetermined position in the battery case is not limited to a method of fixing the film $B_N$12 to the cover 34 (typically, the insulating member 34a placed on the inner side of the cover 34). For example, by a method of fixing the film $B_N$12 to the negative electrode inner terminal 90, a method of fixing the film $B_N$12 to the battery case main body 32, or the like method, the film $B_N$12 can be placed inside the battery case 30 so as to insulate (isolate) the negative electrode inner terminal 90 from the inner wall of the battery case 30 (the battery case main body 32).

Figure 7:
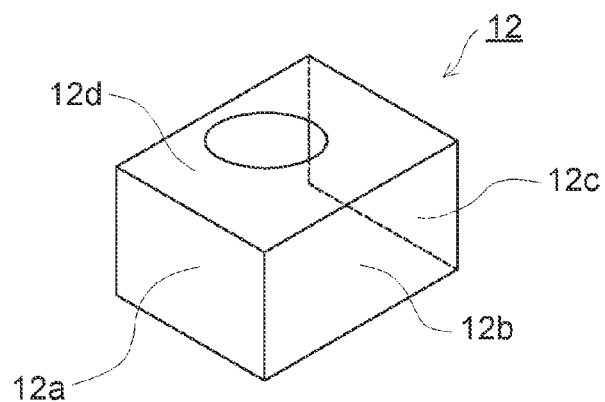
FIG. 7 is a perspective view schematically illustrating a configuration of the film $B_N$ according to one embodiment.
Figure 8:
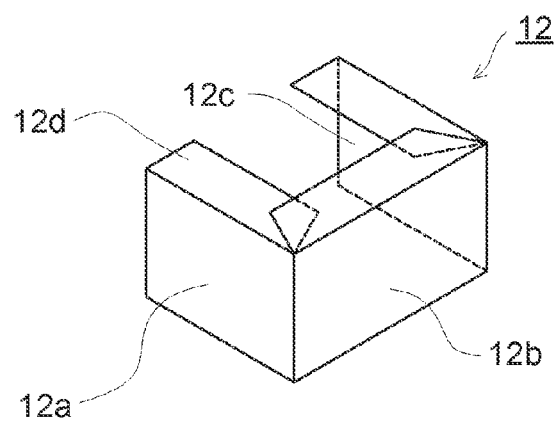
FIG. 8 is a perspective view schematically illustrating a configuration of the film $B_N$ according to one embodiment.

Further, other preferred shapes of the film $B_N$12 include a shape having a surface (a cover facing surface 12d) opposed to the cover 34 in addition to the connection portion covering surface 12a, the current collector tab covering surface 12b, and the negative-electrode active material layer non-forming part covering surface 12c. A typical shape of the film $B_N12$ having such a cover facing surface 12d is illustrated in FIG. 7 or FIG. 8. The film $B_N12$ in a shape having the cover facing surface 12d is typically configured such that the cover facing surface 12d is placed between the negative electrode inner terminal 90 (typically, the current collector plate 96) and the cover. On this account, as illustrated in the figure, on the cover facing surface 12d, the film is partially removed so that the negative electrode inner terminal 90 can be connected to the negative electrode external terminal 44. Note that FIGS. 7 and 8 each illustrate the film $B_N12$ that includes all of the connection portion covering surface 12a, the current collector tab covering surface 12b, and the negative-electrode active material layer non-forming part covering surface 12c. However, the film $B_N12$ according to the present invention is not limited to this. For example, the film $B_N12$ can have a shape constituted by the connection portion covering surface 12a and the cover facing surface 12d, a shape constituted by the connection portion covering surface 12a, the current collector tab covering surface 12b, and the cover facing surface 12d, or the like shape.

The film $B_N12$ illustrated in FIG. 7 is a film having a shape in which the cover facing surface 12d has a hole via which the negative electrode inner terminal 90 can be connected to the negative electrode external terminal 44. The film in such a shape can be formed by a conventionally known method (e.g., injection-molding, thermoforming (heat press molding), stamping molding, or the like) as a molding method of a resin material (typically, olefin resin) that forms an insulator film, for example.

Further, the film $B_N12$ illustrated in FIG. 8 is a film having a shape formed such that the connection portion covering surface 12a, the current collector tab covering surface 12b, and the negative-electrode active material layer non-forming part covering surface 12c are partially folded so as to form the cover facing surface 12d. The film in such a shape can be manufactured such that an insulator film cut with an appropriate size is bent in a predetermined shape, for example. Note that a part where the insulator films overlap with each other in the cover facing surface 12d may be stuck together in a fixed manner. Such a fixation can be performed by fixation by welding or the like, or fixation by use of an adhesive or a sticker.

The film $B_N12$ having the cover facing surface 12d can be placed at a position, inside the battery case 30, at which the negative electrode inner terminal 90 can be insulated (isolated) from the inner wall of the battery case 30 (the battery case main body 32) by fixing the film $B_N12$ to the inner side of the cover 34 (a side placed inside the battery case at the time when the battery case 30 is formed, namely, a side opposed to the electrode body 20 at the time when the battery case 30 is formed), for example, as described above. For example, the film $B_N12$ can be fixed to the inner side of the cover 34 by sandwiching the cover facing surface 12d between the insulating member 34a placed on the inner side of the cover 34 (the cover main body) and the negative electrode inner terminal 90 (typically, the current collector plate 96) or by sandwiching the cover facing surface 12d between the cover main body and the insulating member 34a. Alternatively, the film $B_N12$ can be fixed to the inner side of the cover 34, for example, by welding the cover facing surface 12d to the cover 34 (typically, the insulating member 34a placed on the inner side of the cover 34) or by adhering (bonding) the cover facing surface 12d to the cover 34 by use of an adhesive (a sticker) or the like. For example, the cover facing surface 12d of the film $B_N$ can be fixed to the cover 34 (typically, the insulating member 34a) by use of a welding technique such as ultrasonic welding or laser beam welding or by use of an adhesive or a sticker, as well as spot welding or heat welding. Alternatively, for example, by a method of fixing the film $B_N12$ to the negative electrode inner terminal 90, a method of fixing the film $B_N12$ to the battery case main body 32, or the like method, the film $B_N12$ can be placed inside the battery case 30 so as to insulate (isolate) the negative electrode inner terminal 90 from the inner wall of the battery case 30 (the battery case main body 32).

<<Film $B_P14$>> The film $B_P14$ is placed between the positive electrode inner terminal 80 and the battery case 30 (the battery case main body 32) (typically, between the positive electrode inner terminal 80 and the film A). The insulating film $B_P14$ and the film A realize insulation (isolation) between the positive electrode inner terminal 80 and the inner wall of the battery case 30 (the battery case main body 32). A shape of the film $B_P14$ is not limited in particular provided that the film $B_P14$ and the film A can realize the insulation between the positive electrode inner terminal 80 and the inner wall of the battery case 30 (the battery case main body 32). For example, the film $B_P14$ can have a shape that can insulate (isolate) the positive electrode inner terminal 80 from the battery case 30 (the battery case main body 32). Typically, the film $B_P14$ can have a shape similar to the film $B_N12$, so a detailed description thereof is omitted herein. Note that the film $B_P14$ may have any of the shapes described about the film $B_N12$, and the film $B_N12$ and the film $B_P14$ do not have to have the same shape. From the viewpoint of a cost to manufacture the film $B_N12$ and the film $B_P14$, it is preferable that they have the same shape. Further, the film $B_P14$ may be place at a predetermined position inside the battery case 30 (at a position where the positive electrode inner terminal 80 can be insulated (isolated) from the inner wall of the battery case 30) by a technique similar to the case of the film $B_N12$. Typically, the film $B_P14$ is fixed to the cover 34 so as to be placed in the battery case 30, similarly to the film $B_N12$. Note that a method of placing the film $B_P14$ at a predetermined position inside the battery case 30 may be any of the methods described as the method of placing the film $B_N12$ at a predetermined position inside the battery case 30, and does not need to be the same method. From the viewpoint of manufacture efficiency at the time of manufacturing a battery, it is preferable that the film $B_N12$ and the film $B_P14$ be placed inside the battery case 30 in the same manner.

In a preferred embodiment of the present invention, the film $B_N12$ is formed with a size that allows a part of the film $B_N12$ to overlap with a part of the film A10, and the part of the film $B_N12$ is placed so as to overlap with the part of the film A10 inside the battery case 30. Hereby, even if the film A10 and the film $B_N12$ are misaligned at the time of the manufacture or the use of the battery, it is possible to prevent the electrode body 20 and the negative electrode inner terminal 90 from being exposed without being isolated by (covered with) the insulator film, thereby making it possible to secure, at a high level, the insulation of the electrode body 20 and the negative electrode inner terminal 90 from the inner wall of the battery case 30. Similarly to the film $B_P14$, it is preferable that the film $B_P14$ be formed with a size that allows a part of the film $B_P14$ to overlap with a part of the film A, and the part of the film $B_P14$ be placed so as to overlap with the part of the film A10 inside the battery case 30. This makes it possible to secure, at a high level, the insulation of the electrode body 20 and the positive electrode inner terminal 80 from the inner wall of the battery case 30.

Note that an overlapping width between the film A10 and the film $B_N12$ and an overlapping width between the film A10 and the film $B_P14$ in respective overlapping parts are not limited in particular. However, if the overlap widths are too large, a space of the insulator film to occupy the battery case 30 becomes large. In view of this, the overlapping widths can be about not more than 8 mm (for example, not more than 5 mm, typically, not more than 3 mm). From the viewpoint of minimizing the space occupied by the film A10, the film $B_N12$, and the film $B_P14$ in the battery case 30, the overlapping widths are preferably 1 mm or less (more preferably 0.5 mm or less).

Further, in the overlapping parts, it is preferable that the film A10, the film $B_N12$, and the film $B_P14$ be placed such that the film A10 is placed closer to the battery case 30 (the battery case main body 32) than the film $B_N12$ or the film $B_P14$. Hereby, the film $B_N12$ and the film $B_P14$ can be placed at positions distanced from the joining part between the battery case main body 32 and the cover 34, thereby making it possible to prevent the film $B_N12$ from being sandwiched at the time when the battery case main body 32 is closed by the cover 34. Further, it is possible to prevent troubles such as deformation and break of the insulator film, the troubles being caused due to heat generated at the time when the cover is welded to the opening of the battery case main body.

Figure 9:
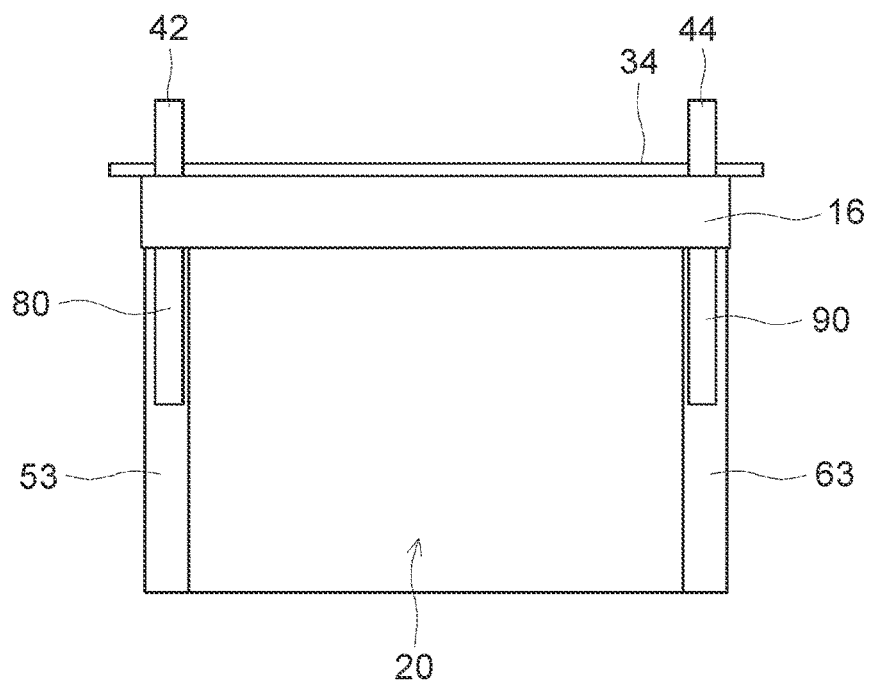
FIG. 9 is a schematic view illustrating an arrangement of an electrode body, a cover, a positive electrode inner terminal, a negative electrode inner terminal, and a film $B_{PN}$ in a nonaqueous electrolyte secondary battery according to one embodiment.

<Second Embodiment> The first embodiment deals with an example in which the film $B_N$ placed between the negative electrode inner terminal and the inner wall of the battery case (the battery case main body) and the film $B_P$ placed between the positive electrode inner terminal and the inner wall of the battery case (the battery case main body) are provided independently from each other (typically, separate films are used to insulate (isolate) the negative electrode inner terminal and the inner wall of the battery case (the battery case main body) and to insulate (isolate) the positive electrode inner terminal and the inner wall of the battery case (the battery case main body)). However, the embodiment of the present invention is not limited to this. For example, as another preferred embodiment (a second embodiment), there is such a configuration that an integrally formed film $B_{PN}$ is provided between an inner wall of a battery case and both of a negative electrode inner terminal and a positive electrode inner terminal (typically, between the film A and both of the negative electrode inner terminal and the positive electrode inner terminal). By the film A and the film $B_{PN}$, an electrode body is insulated (isolated) from the inner wall of the battery case (a battery case main body), and both of the negative electrode inner terminal and the positive electrode inner terminal are insulated (isolated) from the inner wall of the battery case (the battery case main body). For example, the film $B_{PN}$ can be formed from one insulator film. By fixing the film $B_{PN}$ to an inner side of a cover 34 (a side placed inside the battery case at the time when the battery case 30 is formed) so as to cover the positive electrode inner terminal 80 and the negative electrode inner terminal 90, the film $B_{PN}$ can be placed at a predetermined position inside the battery case 30, as illustrated in FIG. 9, for example.

Figure 10:
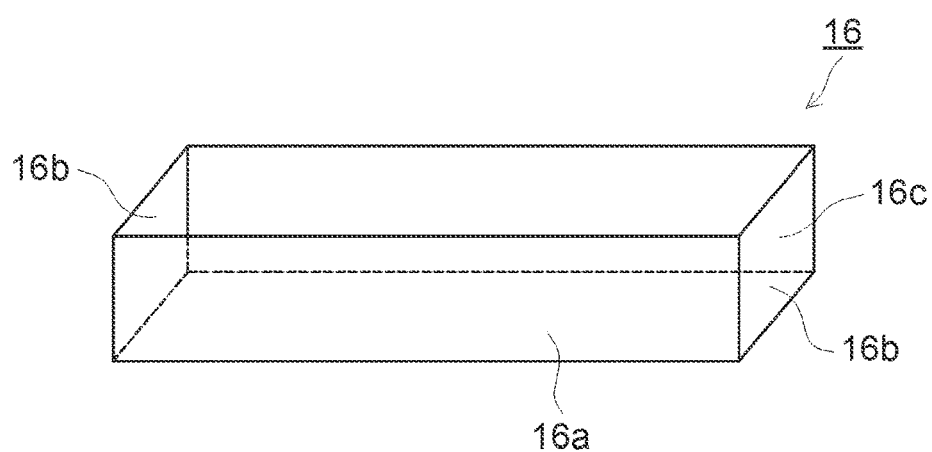
FIG. 10 is a perspective view schematically illustrating a configuration of the film $B_{PN}$ according to one embodiment.
Figure 11:
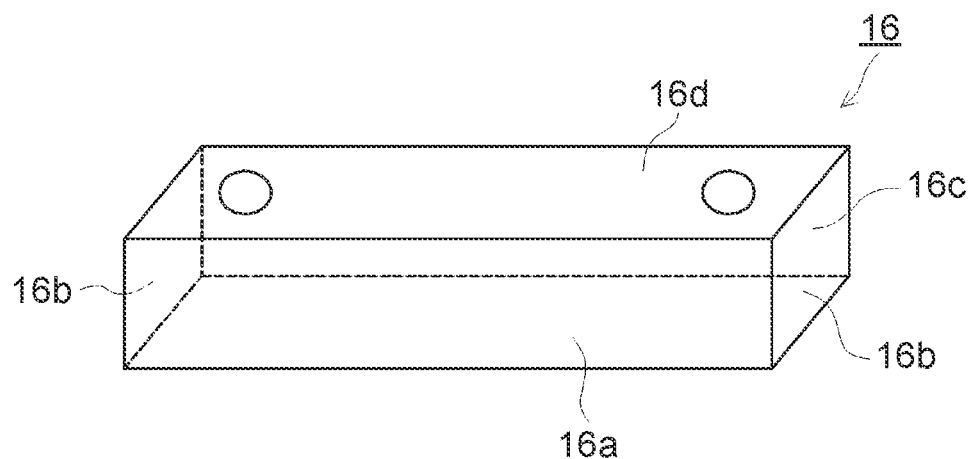
FIG. 11 is a perspective view schematically illustrating a configuration of the film $B_{PN}$ according to one embodiment.
Figure 12:
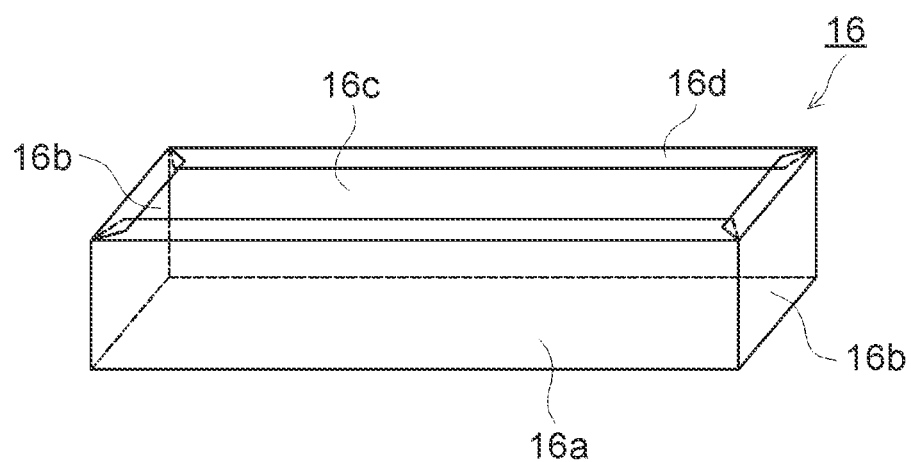
FIG. 12 is a perspective view schematically illustrating a configuration of the film $B_{PN}$ according to one embodiment.

A shape of such a film $B_{PN}$ can be a shape formed such that at least one of the connection portion covering surface 12a, the negative-electrode active material layer non-forming part covering surface 12c, and the cover facing surface 12d in the film $B_N12$ is connected to any of a connection portion covering surface, a positive-electrode active material layer non-forming part covering surface, and a cover facing surface of the film $B_P14$, for example. Preferable examples of the shape of the film $B_{PN}$ are illustrated in FIGS. 10 to 12, although the shape of the film $B_{PN}$ is not limited to them in particular. It is preferable that the film $B_{PN}$ have a shape having at least a connection portion covering surface 16a placed between a wide surface 37 of the battery case 30 and each of a connection portion 84 of the positive electrode inner terminal 80 and a connection portion 94 of the negative electrode inner terminal 90. For example, the film $B_{PN}$ can have a planar shape constituted by the connection portion covering surface 16a, a shape (an L-shape or a laterally U-shape) having the connection portion covering surface 16a and at least one current collector tab covering surface 16b, or a shape (a laterally U-shape or a hollow square shape) having the connection portion covering surface 16a, at least one current collector tab covering surface 16b, and an active material layer non-forming part covering surface 16c. The shape of the film $B_{PN}$ is preferably the hollow square shape illustrated in FIG. 10. Alternatively, the shape of the film $B_{PN}$ can be a shape having at least one of the connection portion covering surface 16a, the current collector tab covering surface 16b, and the active material layer non-forming part covering surface 16c, and a cover facing surface 16d. A typical shape of the film $B_{PN}$ having the connection portion covering surface 16a, two current collector tab covering surface 16b, the active material layer non-forming part covering surface 16c, and the cover facing surface 16d is illustrated in FIG. 11 or 12. Note that, as illustrated in the figure, in the cover facing surface 16d, the film is partially removed so that the negative electrode inner terminal 90 and a negative electrode external terminal 44 can be connected to each other, and the positive electrode inner terminal 80 and a positive electrode external terminal 42 can be connected to each other.

Further, preferably, the film $B_{PN}16$ is formed with a size that allows a part of the film $B_{PN}16$ to overlap with a part of the film A10, and the part of the film $B_{PN}16$ is placed so as to overlap with the part of the film A10 inside the battery case 30.

Note that the embodiment (the second embodiment) can have the same configuration as the first embodiment (a configuration in which the film $B_N$ and the film $B_P$ are provided independently from each other) except that the film $B_{PN}$ that insulates (isolates) both the negative electrode inner terminal and the positive electrode inner terminal from the inner wall of the battery case is provided as the film B, so a detailed description thereof is omitted.

Here, as materials and members that constitute the wound electrode body 20 (e.g., materials and members that constitute the positive electrode 50, the negative electrode 60, and the separator 70) and a nonaqueous electrolyte (typically, a nonaqueous electrolyte solution), the same materials and members to be used in a general nonaqueous electrolyte secondary battery (typically, a lithium-ion secondary battery) in the related art are usable without any limitation. A typical configuration is described below.

The positive electrode 50 can be configured such that a positive-electrode active material layer 54 is formed on a positive-electrode current collector 52 (e.g., an aluminum foil or the like). The positive-electrode active material layer 54 contains at least a positive-electrode active material. Examples of the positive-electrode active material include lithium composite metal oxides having crystal structures such as a layered structure and a spinel structure (e.g., $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiFePO_4$, and the like). The positive-electrode active material layer 54 can include a component other than the active material, e.g., a conductive material, a binder, and the like. As the conductive material, carbon black such as acetylene black (AB), or carbon materials of others (graphite or the like) can be used. As the binder, PVDF or the like can be used.

The negative electrode 60 can be configured such that a negative-electrode active material layer 64 is formed on a negative-electrode current collector 62 (e.g., a copper foil or the like). The negative-electrode active material layer 64 contains at least a negative-electrode active material. As the negative-electrode active material, a so-called graphite base material (graphite), a hardly graphitized carbon material (hard carbon), an easily graphitized carbon material (soft carbon), or carbon materials having structures obtained by combining them can be used preferably. Graphite particles (natural graphite or artificial graphite) that can provide a high energy density are particularly preferable. Further, the negative-electrode active material layer 64 can include a component other than the active material, e.g., a binder, a thickener, and the like. Styrene butadiene rubber (SBR) or the like can be preferably used as the binder, and carboxymethyl cellulose (CMC) or the like can be used as the thickener.

Preferable examples of the separator 70 include porous sheets (films) made of resins such as polyethylene (PE), polypropylene (PP), polyester, cellulose, and polyamide. The porous sheets may have a single-layered structure, or a multilayer structure including two or more layers (e.g., a three-layer structure in which a PP layer is laminated on either side of a PE layer).

As the nonaqueous electrolyte, a nonaqueous electrolyte (typically, a nonaqueous electrolyte solution) containing a supporting salt in an organic solvent (a nonaqueous solvent) can be used. As a preferable example of the nonaqueous solvent, one of ethylene carbonate (EC), propylene carbonate (PC), diethyl carbonate (DEC), dimethyl carbonate (DMC), ethylmethyl carbonate (EMC), and the like can be used solely, or two or more thereof can be used in combination appropriately (a mixed solvent containing EC, EMC, and DMC in a volume ratio of 3:4:3, for example). As the supporting salt, lithium salts such as $LiPF_6$, $LiBF_4$, $LiClO_4$, and the like (preferably, $LiPF_6$) can be used, for example. A concentration of the nonaqueous salt is not less than 0.7 mol/L but not more than 1.3 mol/L (preferably, about 1.1 mol/L).

The present invention has been described with reference to some preferred embodiments, but such description is not limitative and it is needless to say that various modifications can be made. For example, a type of the battery is not limited to the lithium-ion secondary battery, but may be various batteries using different electrode body components and different electrolytes, e.g., a nickel hydrogen battery, a nickel cadmium battery, or a so-called physical cell such as an electric double layer capacitor. Further, a type of the electrolyte is not limited to the nonaqueous electrolyte solution described above, but may be a water electrolyte solution, a solid or gelatinous electrolyte, and the like.

According to the technique disclosed herein, it is possible to provide a highly reliable battery (e.g., a lithium-ion secondary battery) in which an electrode body, a positive electrode inner terminal, and a negative electrode inner terminal are insulated from a battery case by insulator films, as described above. Accordingly, the battery disclosed herein can be preferably used as a driving power supply to be provided in a vehicle such as an automobile, for example. Particularly, the nonaqueous electrolyte secondary battery can be preferably used as a drive power supply for a plug-in hybrid vehicle (PHV), a hybrid vehicle (HV), an electric vehicle (EV), and the like. Further, according to the present invention, it is possible to provide a vehicle including the battery (e.g., a lithium-ion secondary battery) disclosed herein preferably as a power source (typically, an assembled battery configured such that a plurality of secondary batteries is electrically connected to each other).

What is claimed is:

1. A battery comprising:
an electrode body including a positive electrode and a negative electrode, wherein the electrode body is a wound electrode body and formed in a flat shape; and
a battery case that accommodates the electrode body, wherein:
  the battery case includes a battery case main body having an opening through which the electrode body is accommodated, and a cover that closes the opening of the battery case main body;
  the battery case main body includes: a pair of wide surfaces opposed to flat surfaces of the wound electrode body accommodated in the battery case, a of narrow surfaces adjacent to the wide surfaces, and a bottom face, wherein the wide surfaces are wider than the narrow surfaces;
  a positive electrode external terminal and a negative electrode external terminal are provided on an outer surface of the cover, the outer surface being placed outside the battery case;
  a positive electrode inner terminal connected to the positive electrode of the electrode body and a negative electrode inner terminal connected to the negative electrode of the electrode body are placed inside the battery case;
  the positive electrode external terminal includes: a current collector tab attached to the electrode body, a current collector plate electrically connected to the positive electrode external terminal provided in the cover, and a connection portion that connects the current collector plate to the current collector tab,
  wherein the negative electrode external terminal includes: a current collector tab attached to the electrode body, a current collector plate electrically connected to the negative electrode external terminal provided in the cover, and a connection portion that connects the current collector plate to the current collector tab;
  the positive electrode inner terminal and the positive electrode external terminal are electrically connected to each other and the negative electrode inner terminal and the negative electrode external terminal are electrically connected to each other;
  the battery includes, inside the battery case, a first film that is insulative and placed between the electrode body and an inner wall of the battery case main body, and a second film that is insulative and placed between the inner wall of the battery case main body and at least one of the negative electrode inner terminal and the positive electrode inner terminal;
  the electrode body, the positive electrode inner terminal, and the negative electrode inner terminal are not insulated from an inner wall of the battery case by the first insulator file;
  the second film is fixed to the cover, the second film has a shape having a connection portion covering surface placed between at least the connection portion and the wide surface of the battery case, and a current collector tab covering surface placed between the current collector tab and the narrow surface of the battery case main body; and
  by placing the first film and the second film as such, the electrode body is insulated from the inner wall of the battery case main body, and the at least one of the negative electrode inner terminal and the positive electrode inner terminal is insulated from the inner wall of the battery case main body.

2. The battery according to claim 1, wherein
as the second film, the battery separately includes a third film placed between the negative electrode inner terminal and the battery case main body, and a fourth film placed between the positive electrode inner terminal and the battery case main body.

3. The battery according to claim 1, wherein
as the second film, the battery includes a fifth film placed between the battery case main body and both of the negative electrode inner terminal and the positive electrode inner terminal.

4. The battery according to claim 1, wherein:
a part of the first film is placed so as to overlap with a part of the second film; and
in an overlapping part between the part of the first film and the part of the second film, the first film is placed closer to the battery case main body than the second film.

5. The battery according to claim 4, wherein
an overlapping width of the overlapping part between the first film and the second film is not more than 1 mm.

6. The battery according to claim 1, wherein:
the battery case includes a square battery case main body having an opening through which the flat wound electrode body is accommodated, and a cover that closes the opening of the battery case main body;
the positive electrode inner terminal and the negative electrode inner terminal are placed at different end portions, in a lengthwise direction, of the electrode body;
and
the second film is placed between the connection portion of the negative electrode inner terminal and the inner wall of the battery case main body, and/or between the connection portion of the positive electrode inner terminal and the inner wall of the battery case main body.

7. The battery according to claim 2, wherein
the third film and the fourth film are formed from the same material into the same shape.

8. The battery according to claim 4, wherein
a third film and a fourth film are formed from the same material into the same shape.

9. The battery according to claim 6, wherein a third film and a fourth film are formed from the same material into the same shape.

* * * * *